(12) United States Patent
Lee et al.

(10) Patent No.: US 10,629,878 B2
(45) Date of Patent: Apr. 21, 2020

(54) BATTERY PACK INCLUDING SPACER

(71) Applicant: LG CHEM, LTD., Seoul (KR)

(72) Inventors: Yoonhee Lee, Daejeon (KR); Tae Hyuck Kim, Daejeon (KR); Tae Hwan Roh, Daejeon (KR); Jin Kyu Lee, Daejeon (KR); Junhee Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 246 days.

(21) Appl. No.: 15/309,018

(22) PCT Filed: May 12, 2015

(86) PCT No.: PCT/KR2015/004725
§ 371 (c)(1),
(2) Date: Nov. 4, 2016

(87) PCT Pub. No.: WO2015/174714
PCT Pub. Date: Nov. 19, 2015

(65) Prior Publication Data
US 2017/0084892 A1 Mar. 23, 2017

(30) Foreign Application Priority Data
May 12, 2014 (KR) .................. 10-2014-0056620

(51) Int. Cl.
*H01M 2/10* (2006.01)
*H01M 10/48* (2006.01)
(Continued)

(52) U.S. Cl.
CPC ....... *H01M 2/1094* (2013.01); *H01M 2/1022* (2013.01); *H01M 2/1072* (2013.01);
(Continued)

(58) Field of Classification Search
CPC ............ H01M 2/1022; H01M 2/1072; H01M 2/1077; H01M 10/4257
See application file for complete search history.

(56) References Cited

U.S. PATENT DOCUMENTS 4,520,887 A * 6/1985 DiFazio ............. H01M 2/1083
180/68.5
5,353,208 A * 10/1994 Moore .................... F21L 4/005
362/202
(Continued)

FOREIGN PATENT DOCUMENTS

EP       3 142 170 A1    3/2017
JP       01033856 A  *  2/1989  ........... H01M 10/16
(Continued)

OTHER PUBLICATIONS

Translation of Hino et al. JP 01033856 A (Year: 2018).*
(Continued)

*Primary Examiner* — Eli S Mekhlin
(74) *Attorney, Agent, or Firm* — Birch, Stewart, Kolasch & Birch, LLP (57) ABSTRACT

Disclosed herein is a battery pack configured to have a structure in which two or more battery modules, each of which includes a plurality of battery cells or unit modules which can be charged and discharged, are arranged such that the battery modules are mounted in a space defined between a pack housing and a base plate, the battery pack including the base plate on which the arranged battery modules are loaded, a sensing assembly mounted at upper ends of the battery modules for detecting voltage of the battery modules, a pair of tension bars mounted at the upper ends of the battery modules in a direction in which the battery modules are arranged for supporting the battery modules, a battery management system (BMS) mounted at an outside of an outermost one of the battery modules in a state in which the
(Continued)

BMS is adjacent to the outermost one of the battery modules, the pack housing for surrounding the battery modules and the BMS, a lower end of the pack housing being coupled to the base plate, and a spacer disposed in a space defined between an inner surface of the pack housing and outer surfaces of the battery modules for restraining motion of upper end parts of the battery modules.

17 Claims, 5 Drawing Sheets (51) Int. Cl.
    *H01M 10/42*     (2006.01)
    *H01M 2/02*     (2006.01)

(52) U.S. Cl.
    CPC ..... *H01M 2/1077* (2013.01); *H01M 10/4257* (2013.01); *H01M 10/482* (2013.01); *H01M 2/0207* (2013.01); *H01M 2/0287* (2013.01)

(56) References Cited

U.S. PATENT DOCUMENTS

| | | | | |
|---|---|---|---|---|
| 5,378,555 | A * | 1/1995 | Waters | B60K 1/04 180/68.5 |
| 5,756,227 | A * | 5/1998 | Suzuki | F28F 3/02 429/120 |
| 2007/0259258 | A1* | 11/2007 | Buck | B29C 44/1233 429/120 |
| 2010/0286294 | A1* | 11/2010 | Huang | C08F 255/02 521/80 |
| 2011/0020677 | A1* | 1/2011 | Shin | H01M 2/0277 429/71 |
| 2011/0059342 | A1* | 3/2011 | Lee | H01M 2/1077 429/93 |
| 2011/0104532 | A1* | 5/2011 | Buck | F16K 17/16 429/82 |
| 2011/0189514 | A1* | 8/2011 | Lee | H01M 2/1077 429/61 |
| 2011/0293973 | A1 | 12/2011 | Kim | |
| 2012/0003520 | A1 | 1/2012 | Lee et al. | |
| 2012/0040226 | A1* | 2/2012 | Kim | H01M 2/1077 429/120 |
| 2012/0082875 | A1 | 4/2012 | Watanabe et al. | |
| 2012/0094166 | A1 | 4/2012 | Lee et al. | |
| 2012/0171532 | A1* | 7/2012 | Lee | H01M 2/1077 429/72 |
| 2012/0263995 | A1 | 10/2012 | Naito et al. | |
| 2013/0164578 | A1* | 6/2013 | Sweet | H01M 10/0413 429/82 |
| 2013/0224607 | A1* | 8/2013 | Ihara | H01M 10/0569 429/338 |
| 2014/0011059 | A1 | 1/2014 | Hashimoto et al. | |
| 2014/0017542 | A1 | 1/2014 | Suzuki | |

FOREIGN PATENT DOCUMENTS

| | | |
|---|---|---|
| JP | 5-193366 A | 8/1993 |
| JP | 2011-236937 A | 8/2001 |
| JP | 2008-277058 A | 11/2008 |
| JP | 2012-502425 A | 1/2012 |
| JP | 2012-94476 A | 5/2012 |
| JP | 2014-501021 A | 1/2014 |
| KR | 10-0776767 B1 | 11/2007 |
| KR | 10-2008-0058968 A | 6/2008 |
| KR | 10-2011-0030225 A | 3/2011 |
| KR | 10-2011-0129799 A | 12/2011 |
| KR | 10-2012-0044853 A | 5/2012 |
| KR | 10-2012-0055451 A | 5/2012 |
| KR | 10-2013-0123981 A | 11/2013 |
| KR | 10-2013-0133118 A | 12/2013 |

OTHER PUBLICATIONS

Extended European Search Report dated Jun. 8, 2017 in European Patent Application No. 15792732.8.
Inernational Search Report, issued in PCT/KR2015/004725 (PCT/ISA/210), dated Aug. 13, 2015.

* cited by examiner

BATTERY PACK INCLUDING SPACER

TECHNICAL FIELD

The present invention relates to a battery pack including a spacer.

BACKGROUND ART

In recent years, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to one another because high output and large capacity are necessary for the middle or large-sized devices. In order to provide output and capacity required by a predetermined apparatus or device, a plurality of battery cells or battery modules may be connected in series to each other.

In general, a high-capacity/high-output battery pack is configured to have a structure in which a plurality of battery cells or battery modules is loaded on a base plate in a state in which the battery cells or the battery modules are stacked such that the battery cells or the battery modules are adjacent to each other and a pack housing is coupled to the base plate such that the pack housing surrounds the battery cells or battery modules. In this structure, the battery modules may move due to vibration caused in a driving condition of a device in which the battery pack is mounted. In order to prevent such motion of the battery modules, a tension bar is mounted at the upper ends of the battery modules in a direction in which the battery modules are arranged.

In the above structure, however, it is not possible to sufficiently prevent motion of the battery modules in a lateral direction thereof when vibration is generated from the battery pack in a lateral direction thereof. In addition, since an empty space is provided between the pack housing and the battery modules, condensed water generated on the inner surface of the pack housing due to a temperature difference between the inside and the outside of the battery pack may fall to the upper ends of the battery modules with the result that the battery pack may malfunction.

DISCLOSURE

Technical Problem

Therefore, the present invention has been made to solve the above problems, and other technical problems that have yet to be resolved.

Specifically, it is an object of the present invention to provide a battery pack configured such that a fixing structure of a battery module is securely and stably maintained even when external impact or vibration is generated and the battery module is protected from condensed water generated due to a temperature difference between the inside and the outside of the battery pack.

Technical Solution

In accordance with one aspect of the present invention, the above and other objects can be accomplished by the provision of a battery pack comprising a pack housing, a base plate, at least two battery modules arranged such that the battery modules are located in a space defined between the pack housing and the base plate, each battery module including a plurality of battery cells or unit modules which can be charged and discharged, and a spacer disposed in a space defined between an inner surface of the pack housing and upper, outer surfaces of the battery modules to restrain motion of upper end parts of the battery modules.

The spacer is a member filled in a space defined between the upper end parts of the battery modules and the inner surface of the pack housing. In other words, the spacer is closely disposed in the space being formed between the upper end parts of the battery modules and the inner surface of the pack housing without any empty space.

That is, in the battery pack according to the present invention, the spacer is disposed in the space defined between the inner surface of the pack housing and the outer surfaces of the battery modules so as to restrain motion of the upper end parts of the battery modules. Even when external impact or vibration is generated, therefore, the fixing structure of the battery modules may be securely and stably maintained and the battery modules may be protected from condensed water generated due to a temperature difference between the inside and the outside of the battery pack.

Each of the battery cells may be configured to have a structure in which an electrode assembly is mounted in a battery case made of a laminate sheet including a metal layer and a resin layer and an outer edge of the battery case is sealed. The laminate sheet may include an outer resin layer exhibiting high durability, a metal blocking layer, and a resin sealant layer exhibiting a high thermal bonding property. The resin sealant layer may be thermally bonded.

It is required for the outer resin layer to exhibit high resistance against external environment. For this reason, it is necessary for the outer resin layer to exhibit more than predetermined tensile strength and weather resistance. To this end, the outer resin layer may be made of a polymer resin, such as polyethylene terephthalate (PET) or oriented nylon film. However, the present invention is not limited thereto.

It is required for the metal blocking layer to have a function to improve strength of the battery case in addition to a function to prevent introduction or leakage of foreign matter, such as gas or moisture. To this end, the metal blocking layer may be made of, for example, aluminum.

The resin sealant layer may be made of a polyolefin resin which exhibits a high thermal bonding property (thermal adhesive property) and a low hygroscopic property, which is necessary to restrain permeation of an electrolyte, and is not expanded or is not corroded by the electrolyte. In a concrete example, resin sealant layer may be made of a cast polypropylene (CPP) resin.

Each of the battery cells may be mounted in a battery cartridge. In a concrete example, the cartridge may include at least a pair of plate-shaped frames to fix an outer edge of a corresponding battery cell in a state in which at least one of the opposite main surfaces of the corresponding battery cell is exposed.

Each of the battery modules may be configured to have a rectangular structure and the battery modules may be loaded on the base plate such that the battery modules laterally abut each other in a state in which the battery modules are erected such that electrode terminals face tops of the battery modules.

Specifically, each of the battery modules may be configured to have a structure in which the height of each of the battery modules is greater than the width of each of the battery modules in the erected state. The width of each of the battery modules, i.e. the length of each of the battery modules in a direction in which the battery cells are arranged such that the battery cells are joined to each other at an interface between the respective battery cells, may be equivalent to 50% to 80% the height of each of the battery modules.

In an embodiment, the battery pack further comprises: a sensing assembly mounted at upper ends of the battery modules to detect voltage of the battery modules; and a battery management system (BMS) mounted at an outside of an outermost one of the battery modules in a state in which the BMS is adjacent to the outermost one of the battery modules, wherein the pack housing surrounds the battery modules and the BMS, and wherein a lower end of the pack housing is coupled to the base plate.

In a concrete example of the present invention, the top of the spacer may abut on the inner surface of the pack housing and the bottom of the spacer may abut on the sensing assembly, the tension bars, and exposed tops of the battery modules.

Specifically, the top of the spacer may be formed in a shape corresponding to the inner surface of the pack housing and the bottom of the spacer may be formed in a shape corresponding to the sensing assembly, the tension bars, and the exposed tops of the battery modules.

In addition, the spacer may be configured to have a structure for surrounding opposite ends of the upper end parts of the battery modules in addition to the above-described structure.

Also, the battery pack according to the present invention further comprises a pair of tension bars mounted at the upper ends of the battery modules, the tension bars extending in a direction in which the battery modules are arranged to support the battery modules.

The tension bars may be provided with at least two through holes such that the tension bars are mounted at the battery modules. The battery cells are provided at upper end parts thereof with through holes, which are located at the same positions as the through holes of the tension bars on a vertical line. The tension bars may be fastened to the battery modules through coupling between a bolt inserted through each of the through holes and a nut.

In an embodiment, the spacer may be provided at the inner surface thereof with depressions, each of which is formed in a shape corresponding to the bolt and the nut, and the bolts are received in the depressions to fix the spacer. That is, stability of the battery pack may be achieved by inserting the bolts and the nuts into the depressions without an additional fastening structure.

In another embodiment, the spacer may be provided with fastening holes, each of which is formed in a shape corresponding to the bolt, and each bolt may be sequentially inserted through a corresponding one of the fastening holes and a corresponding one of the through holes and then coupled to the nut to fix the spacer.

The spacer may be made of polymer resin foam and the polymer resin foam may contain closed pores.

Specifically, the polymer resin foam may be expanded polypropylene (EPP). However, the present invention is not limited thereto.

Each of the battery cells may be a lithium secondary battery. Specifically, each of the battery cells may be a lithium ion battery or a lithium ion polymer battery.

The spacer may be restrained lateral motion of the upper end parts of the battery modules.

In accordance with another aspect of the present invention, there is provided a device including the battery pack with the above-stated construction as a power source.

Specifically, the device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

Meanwhile, in a case in which the battery pack is mounted in any one selected from among an electric vehicle, a hybrid electric vehicle, and a plug-in hybrid electric vehicle, the battery pack may be located in a space defined between a driver's seat and a seat next to the driver's seat. As the battery pack is located between the driver's seat and the seat next to the driver's seat, the battery pack is mounted through a side crash beam of the vehicle in which the battery pack is mounted. In order to support the cut side crash beam, a middle plate including a crash beam abutting on the side crash beam may be mounted in the battery pack.

The structure and manufacturing method of the device are well known in the art to which the present invention pertains and, therefore, a detailed description thereof will be omitted.

Effects of the Invention

As is apparent from the above description, in the battery pack according to the present invention, the spacer is disposed in the space defined between the inner surface of the pack housing and the outer surfaces of the battery modules so as to restrain motion of the upper end parts of the battery modules. Even when external impact or vibration is generated, therefore, the fixing structure of the battery modules may be securely and stably maintained and the battery modules may be protected from condensed water generated due to a temperature difference between the inside and the outside of the battery pack.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
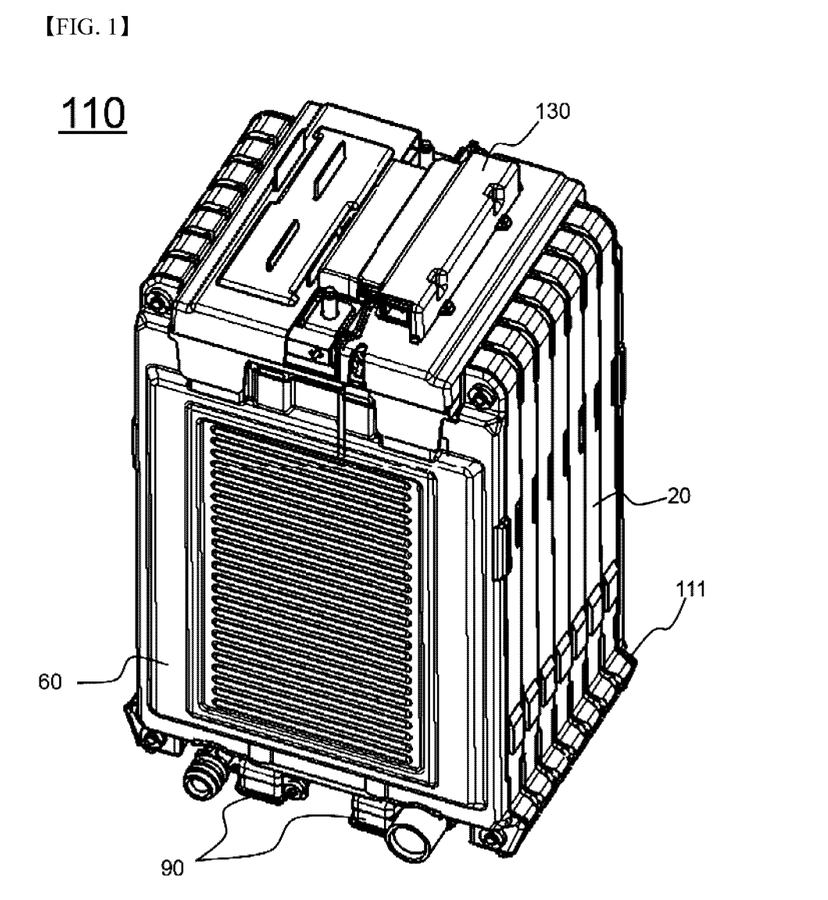
FIG. 1 is a perspective view showing a battery module according to an embodiment of the present invention.
Figure 2:
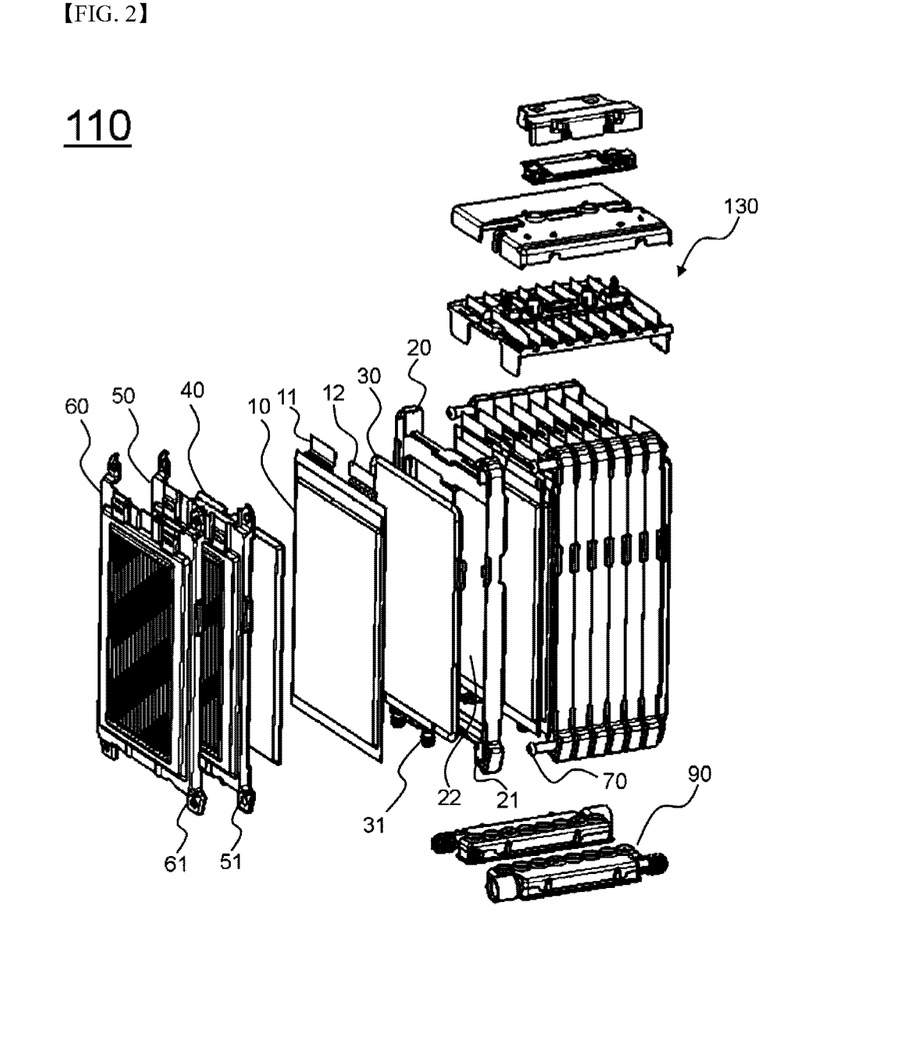
FIG. 2 is an exploded view of the battery module of FIG. 1.
Figure 3:
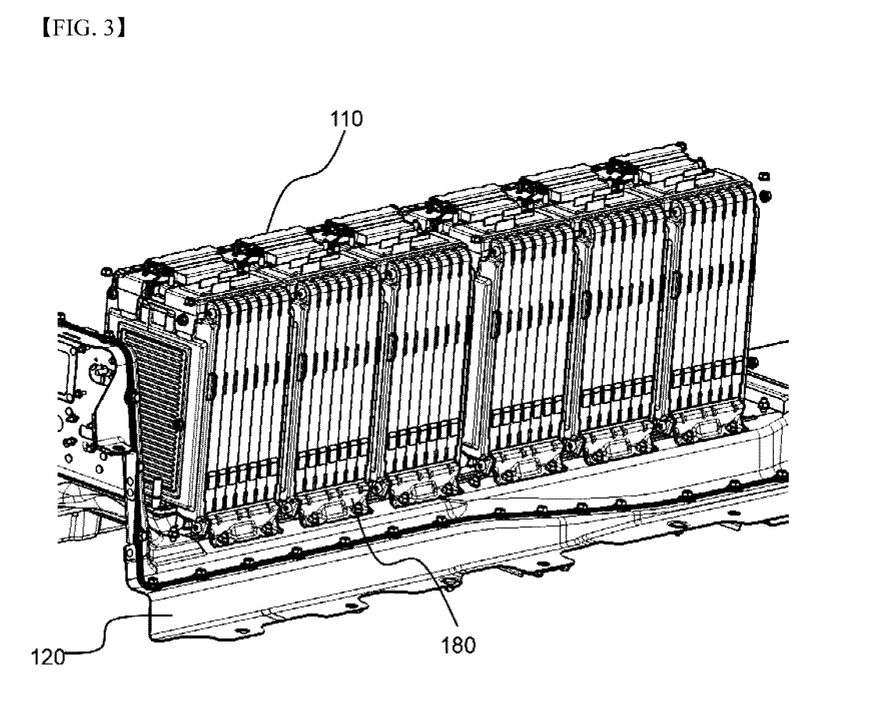
FIG. 3 is a perspective view showing a battery module and a hold down bracket according to an embodiment of the present invention.

FIG. 1 is a perspective view showing a battery module according to an embodiment of the present invention, FIG. 2 is an exploded view of the battery module of FIG. 1, and FIG. 3 is a perspective view showing a battery module and a hold down bracket according to an embodiment of the present invention;

Referring to FIG. 1 and FIG. 2, a battery module (110) includes a battery cell 10, a cartridge 20, a cooling member 30, a buffer member 40, an insulation member 50, an end plate 60, a bus bar assembly 80, and a cooling manifold 90.

The battery cell 10 is configured to have a structure in which an electrode assembly is mounted in a battery case made of a laminate sheet including a metal layer and a resin layer and an outer edge of the battery case is sealed. And the battery cell 10 is provided with a positive electrode terminal 11 and a negative electrode terminal 12 being formed on the one side in a collinear state.

The central portion of the cartridge 20 is provided with a battery cell receiving part 22 to mount the battery cells 10, and two battery cells 10 are mounted to a front side and a back side, respectively, of the battery cell receiving part 22 in a state in which the cooling member 30 is disposed between the two battery cells 10.

A plurality of the cartridge 20 in which the battery cells 10 and the cooling member 30 are mounted are arranged such that the battery cells 10 laterally abut each other. The buffer member 40 is mounted to the outermost battery cells 10. The insulation member 50 is added to the buffer member 40. Finally, the end plate 60 is mounted on the insulation member 50.

The cartridge 20, the insulation member 50, and the endplate 60 are provided with coupling holes 21, 51, 61 at their four corners, respectively. The cartridge 20, the insulation member 50, and the endplate 60 constituting the battery module 110 are configured to have a structure in which each of coupling bolt 70 is inserted through the coupling holes 21, 51, 61, and then the cartridge 20, the insulation member 50, and the endplate 60 are coupled and fixed.

The sensing assembly 130 is mounted on the upper of the battery cells 10 connected as described above. The sensing assembly 130 connects the battery cells 10 in series and/or parallel and, performs a function in which an electric flow cuts off in case of a malfunction of the battery module 110, by detecting voltage of the battery cells 10 and having safety elements.

The cooling manifold 90 is mounted to the lower part of the battery cell 10. The cooling manifold 90 is connected to the cooling conduit 31 of the cooling members 30, and make a coolant flow through the the cooling conduit 31.

Referring to FIG. 3, a plurality of the battery modules 110 are mounted on the base plate 120 such that the battery modules 110 laterally abut each other, and fixed by the hold down bracket 180 as a fixing member. Specifically, the hold down bracket 180 presses the lower protruding part 111 (FIG. 1) of the battery module 110. The hold down bracket 110 is configured to be fixed to the base plate 120 by using bolts and nuts.

Figure 4:
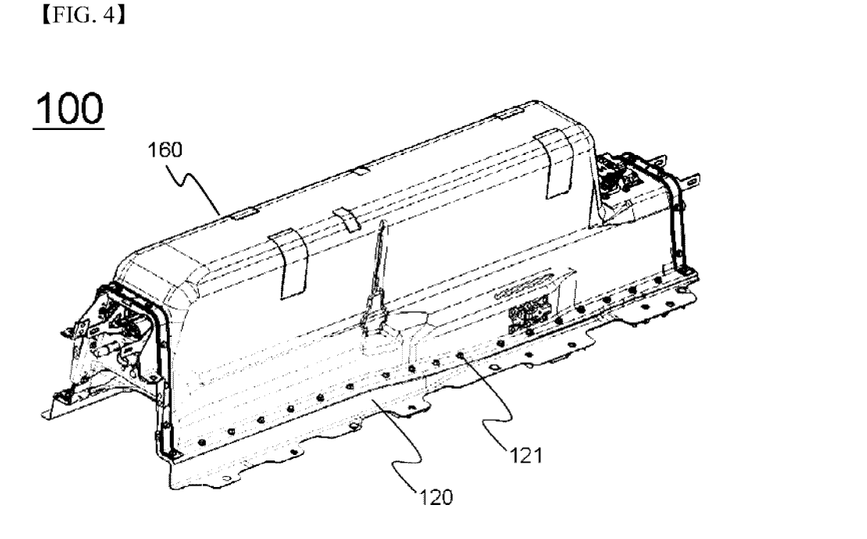
FIG. 4 is a perspective view showing a battery pack according to an embodiment of the present invention.
Figure 5:
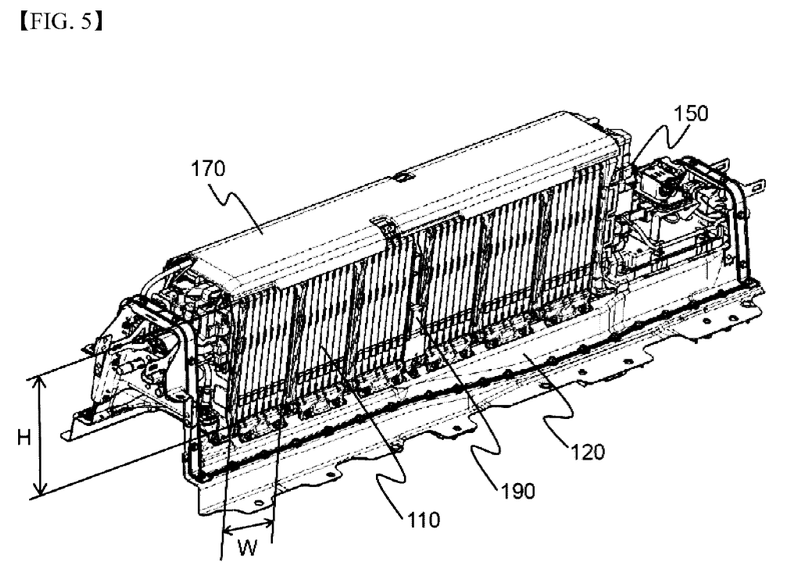
FIG. 5 is a perspective view showing the battery pack from which a pack housing of FIG. 4 is removed.
Figure 6:
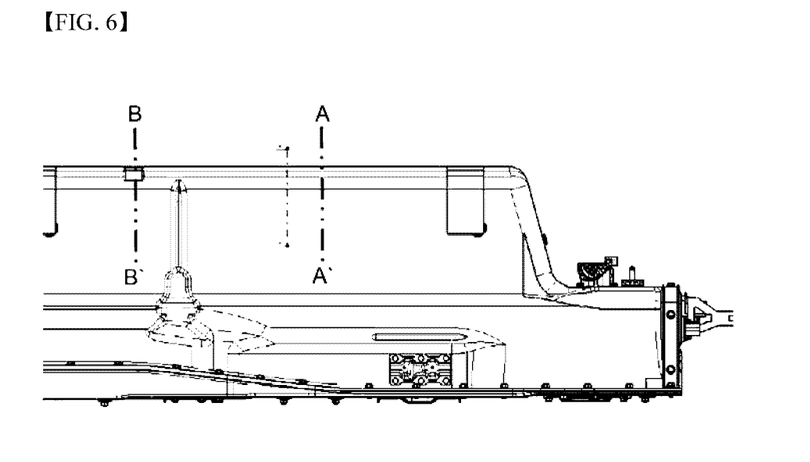
FIG. 6 is a side view showing the battery pack of FIG. 4.
Figure 7:
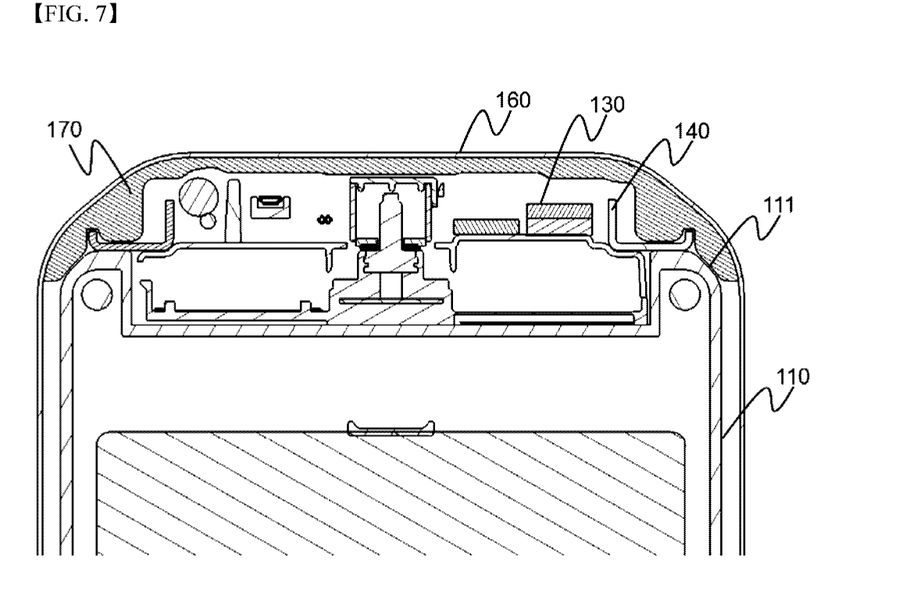
FIG. 7 is a vertical sectional view taken along line A-A' of FIG. 6.
Figure 8:
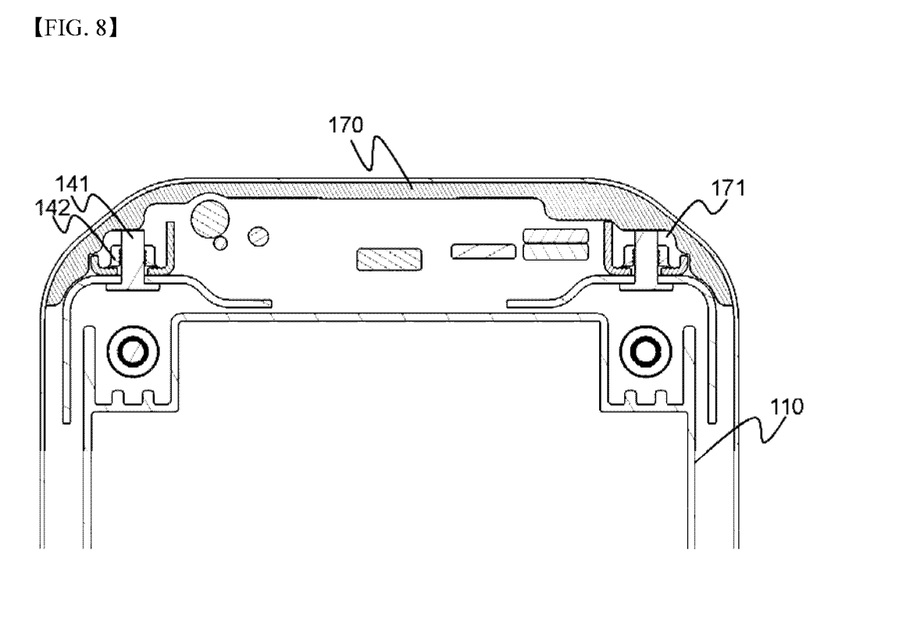
FIG. 8 is a vertical sectional view taken along line B-B' of FIG. 6.

FIG. 4 is a perspective view showing a battery pack according to an embodiment of the present invention, FIG. 5 is a perspective view showing the battery pack from which a pack housing of FIG. 4 is removed, FIG. 6 is a side view showing the battery pack of FIG. 4, FIG. 7 is a vertical sectional view taken along line A-A' of FIG. 6, and FIG. 8 is a vertical sectional view taken along line B-B' of FIG. 6.

Referring to FIGS. 4 to 8, a battery pack 100 includes a plurality of battery modules 110, a base plate 120, a sensing assembly 130, tension bars 140, a battery management system (BMS) 150, a pack housing 160, and a spacer 170.

The battery modules 110 are arranged on the base plate 120 in a state in which the battery modules 110 laterally abut on each other. A middle plate 190 is mounted at the middle of the battery modules 110.

The sensing assembly 130 is mounted at the upper ends of the battery modules 110 for sensing voltage of the battery modules 110. At opposite ends of the sensing assembly 130, the tension bars 140 are mounted at the upper ends of the battery modules 110 in a direction in which the battery modules 110 are arranged for supporting the battery modules 110.

The BMS 150 is mounted at the outside of the outermost one of the battery modules 110 in a state in which the BMS 150 is adjacent to the outermost one of the battery modules 110. The lower end of the pack housing 160 is coupled to the base plate 120 in a state in which the pack housing 160 surrounds the battery modules 110 and the BMS 150. The pack housing 160 and the base plate 120 are coupled to each other by bolts (not shown) and nuts (not shown).

The spacer 170 is disposed in a space defined between the inner surface of the pack housing 160 and the upper end surfaces of the battery modules 110.

Each of the battery modules 110 is configured to have a rectangular structure. A height H of each of the battery modules 110 is greater than a width W of each of the battery modules 110. Specifically, the W of each of the battery modules 110 is equivalent to about 60% the height H of each of the battery modules 110.

Referring to FIG. 7, the top of the spacer 170 is formed in a shape corresponding to the inner surface of the pack housing 160 such that the top of the spacer 170 abuts on the inner surface of the pack housing 160. The bottom of the spacer 170 is formed in a shape corresponding to the sensing assembly 130, the tension bars 140, and exposed tops of the battery modules 110 such that the bottom of the spacer 170 abuts on the sensing assembly 130, the tension bars 140, and the exposed tops of the battery modules 110.

In addition, the spacer 170 is configured to have a structure for surrounding opposite ends 111 of the upper end parts of the battery modules 110.

Referring to FIG. 8, the spacer 170 is provided with depressions 171, each of which is formed in a shape corresponding to a bolt 141 and a nut 142. The bolt 141 and the nut 142 are inserted into each of the depressions 171 such that the spacer 170 is fixed to the upper ends of the battery modules 110.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A battery pack comprising:
a pack housing;
a base plate;
at least two battery modules defining a battery module array, the battery module array being arranged such that the battery modules are located in a space defined between the pack housing and the base plate, and each battery module including a plurality of battery cells which can be charged and discharged;

a spacer disposed in a space defined between an inner surface of the pack housing and upper, outer surfaces of the battery modules to restrain motion of upper end parts of the battery modules;

a sensing assembly mounted between upper ends of the battery modules and the spacer to detect voltage of the battery modules; and a pair of tension bars mounted at the upper end of the battery module array, the tension bars extending in a direction in which the battery modules are arranged to support the battery modules, wherein the tension bars are provided with at least two through holes and the battery modules are provided at upper end parts thereof with through holes, which are located at the same positions as the through holes of the tension bars on a vertical line, such that the tension bars are fastened to the battery modules through coupling between a bolt inserted through each of the through holes of the tension bars and the corresponding through holes of the battery modules, and a nut, the bolts extending normal to the upper end parts and perpendicular to the direction in which the battery modules are arranged, and wherein the spacer is provided with depressions, each of which is formed in a shape corresponding to the bolt and the nut, and the bolts are received in the depressions to fix the spacer.

2. The battery pack according to claim 1, wherein each of the battery cells is configured to have a structure in which an electrode assembly is mounted in a battery case made of a laminate sheet comprising a metal layer and a resin layer and an outer edge of the battery case is sealed.

3. The battery pack according to claim 1, wherein each of the battery cells is mounted in a battery cartridge.

4. The battery pack according to claim 3, wherein each cartridge comprises at least a pair of plate-shaped frames to fix an outer edge of a corresponding battery cell in a state in which at least one of opposite main surfaces of the corresponding battery cells is exposed.

5. The battery pack according to claim 1, wherein each of the battery modules is configured to have a rectangular structure, and the battery modules are loaded on the base plate such that the battery modules laterally abut each other in a state in which the battery modules are erected such that electrode terminals face tops of the battery modules.

6. The battery pack according to claim 5, wherein each of the battery modules is configured to have a structure in which a height of each of the battery modules is greater than a width of each of the battery modules in the erected state.

7. The battery pack according to claim 1, further comprising:

a battery management system (BMS) mounted at an outside of an outermost one of the battery modules in a state in which the BMS is adjacent to the outermost one of the battery modules, wherein the pack housing surrounds the battery modules and the BMS, and wherein a lower end of the pack housing is coupled to the base plate.

8. The battery pack according to claim 7, wherein a bottom of the spacer abuts the sensing assembly and exposed tops of the battery modules.

9. The battery pack according to claim 8, wherein the spacer is configured to have a structure for surrounding opposite ends of the upper end parts of the battery modules.

10. The battery pack according to claim 1, wherein a bottom of the spacer is formed in a shape corresponding to the tension bars and exposed tops of the battery modules.

11. The battery pack according to claim 1, wherein the spacer is made of polymer resin foam.

12. The battery pack according to claim 11, wherein the polymer resin foam contains closed pores.

13. The battery pack according to claim 11, wherein the polymer resin foam is expanded polypropylene (EPP).

14. The battery pack according to claim 1, wherein each of the battery cells is a lithium secondary battery.

15. The battery pack according to claim 1, wherein the spacer restrains lateral motion of the upper end parts of the battery modules.

16. A device comprising a battery pack according to claim 1 as a power source.

17. The device according to claim 16, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

* * * * *